(No Model.)

G. GRISEL.
CARRIAGE FOR GARDEN HOSE.

No. 300,772. Patented June 24, 1884.

Witnesses:

Inventor:
George Grisel
By his Atty.,

UNITED STATES PATENT OFFICE.

GEORGE GRISEL, OF OAKLAND, CALIFORNIA.

CARRIAGE FOR GARDEN-HOSE.

SPECIFICATION forming part of Letters Patent No. 300,772, dated June 24, 1884.

Application filed January 26, 1883. (No model.)

*To all whom it may concern:*

Be it known that I, GEORGE GRISEL, a citizen of the Republic of France, residing in Oakland, in the county of Alameda, State of California, have made and invented a new and useful Improvement in Carriages for Garden-Hose; and I do hereby declare that the following is a full, clear, and exact description of the same, reference being had to the accompanying drawings.

My invention relates to an improvement in hose trucks and carriages that are designed to hold and operate hose for garden-sprinkling, washing, and other light work.

The object of the improvement is to enable the carriage to be moved about from point to point while the hose is in working connection with the hydrant, without interfering with the continuous operation of the nozzle or sprinkler. The nozzle being properly poised and set, the carriage can be used or set at any distance from the hydrant-connection by simply running off more or less length of hose from the reel.

The following description fully explains the nature of my said invention, and the manner in which I proceed to construct, apply, use, and operate the same.

Figure 1:
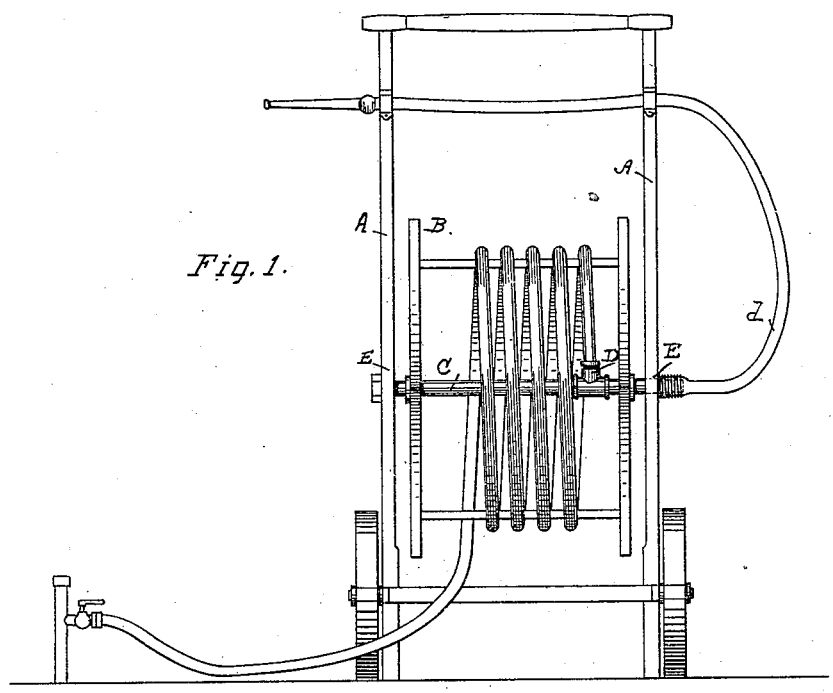
Figure 2:
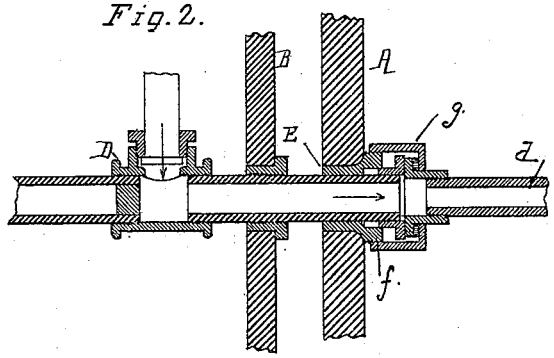

In the drawings herein referred to, Figure 1 is a front elevation of a small truck or carriage for garden use having my improvement applied to the reel. Fig. 2 is a longitudinal section through the reel-shaft, showing the couplings for the hose and the connection for the nozzle.

A represents the frame of the truck. B is the hose-reel, and C is the shaft on which it revolves.

To carry out my invention I proceed substantially as follows: I remove the ordinary axle of the reel and substitute for it a hollow tube or an axle having a hollow space at one end. This is easily made from a piece of metal tube, C, having a coupling, D, interposed in its length and placed near to one head of the reel. Bearings E E are provided in the truck A A for the shaft, and one end is carried out beyond the frame to receive the flexible nozzle-pipe connection, which is secured onto the end in the usual manner, as shown in Fig. 1. The flexible hose $d$ is secured by a coupling directly to the hollow shaft, so that the turning of the shaft will not affect the position of the hose. The length of nozzle-hose $d$ is also connected with the end of the hollow shaft by a coupling of such construction that the reel and shaft can rotate independently of the nozzle-hose. Such a coupling is readily formed after the manner shown in Fig. 2 of the drawings, where the end of the shaft is set into a box, E, having an exterior screw-thread, $f$, on the outer end to receive the coupling $g$ of the hose $d$. The shaft then turns freely in the box F without twisting the hose. The ordinary fastening, by wiring the end of the nozzle-hose upon the end of the shaft, will serve quite as well, however, for the hose $d$, when filled with water, will turn readily with the shaft, and will not twist.

Having thus fully described my invention, what I claim, and desire to secure by Letters Patent, is—

1. In a hose-carriage, the combination, with the hollow shaft C, formed in two parts, and the hose connecting said shaft to the water-supply, of a coupling, D, uniting the two lengths of shaft and the hose, substantially as set forth.

2. In a hose-carriage, the combination, with the two-part hollow shaft C and frame for supporting the same, of a coupling, D, having the connection at each end for the two parts of the shaft, and a third connection on the side adapted to receive the hose, as set forth.

GEORGE GRISEL.

Witnesses:
EDWARD E. OSBORN,
GEO. VINCENT.